United States Patent Office 3,491,049
Patented Jan. 20, 1970

3,491,049
LOW WATER-LOSS AQUEOUS CEMENT SLURRY AND METHOD OF USE
Daniel L. Gibson and Clare H. Kucera, Tulsa, Okla., assignors to The Dow Chemical Company, Midland, Mich., a corporation of Delaware
No Drawing. Filed Oct. 13, 1965, Ser. No. 495,685
Int. Cl. C04b 25/06
U.S. Cl. 260—29.2    13 Claims

ABSTRACT OF THE DISCLOSURE

A settable aqueous hydraulic cement slurry, exhibiting improved resistance to loss of fluid therefrom to a porous medium in contact therewith while a slurry, comprising a pumpable admixture of an hydraulic cement, water, and a small but effective amount of a fluid-loss control agent selected from the class consisting of polyalkylenepolyamines, polyalkylenimines, and mixtures thereof, and method of cementing wells in porous geologic formations comprising injecting and emplacing said slurry therein and allowing it to set to a solid in contact with said formation.

---

The invention is concerned with a novel aqueous hydraulic cement composition which exhibits low loss of water to porous media with which it is brought into contact and with a method of cementing wherein an aqueous hydraulic cement slurry is brought into contact with porous media, e.g. porous earthen or rock strata. The invention is especially concerned with cementing casings in place and cementing off water or brine zones in wellbores and in grouting and in the construction of cement dikes and dams and of cement-lined tunnels, shafts, and the like.

By the term hydraulic cement as used herein is meant Portland, aluminous, or Pozzolan cement, lime, silica, or alumina, including cements wherein minor amounts of other oxides, e.g. iron oxide, may also be present. By definition, an hydraulic cement is any cement that hardens or sets under water and such use is observed herein. Pozzolan cements include slag cements made from slaked lime and granulated blast furnace slag. Because of its superior strength Portland cements are usually preferred among the hydraulic cements but certain advantages are often gained by the use of other hydraulic cements particularly in admixture with Portland cement. As used herein the term hydraulic cements includes minor amounts of extenders such as bentonite and/or gilsonite and includes such cements used either without any appreciable sand or aggregate material (such cement usually being referred to as neat cement) or such cements in admixture with granular filling material and/or aggregate including sand, ground limestone, pebbles, and the like.

Hydraulic cements are customarily admixed with water and used as aqueous slurries. The amount of water employed may vary rather extensively dependent largely upon the fluidity of the slurry required and upon the ultimate strength properties necessary. Too little water tends to result in non-uniform mixing which leads to the formation of weak spots and is often associated with difficulties of pumping such low-water slurries. On the other hand, an excessive amount of water results in handling and emplacing of additional bulk of slurry and in an impairment of the ultimate strength properties of the cement when set. The amount of water usually employed is that which permits relatively easy pumping and yet results in a set cement of adequate strength. Usually the proportion of water to hydraulic cement in an aqueous hydraulic cement slurry is between about 35 and 55 parts by weight of water per 100 parts by weight of the cement and more commonly between about 40 and 50 parts of water per 100 parts of cement.

In a great many uses of an hydraulic cement, it is necessary for the cement slurry to be emplaced within or next to a porous media particularly earthen strata, e.g. cementing off wellbores, grouting, and dam and tunnel construction. When such is the case, water filters out of the slurry into the strata during the setting period. When this occurs to any marked extent, there usually results an uncontrolled setting rate, improper placement, impaired strength properties, and usually a contamination of the surrounding strata. All of these undesirable conditions are especially to be avoided in cementing operations associated with oil, gas, water, or brine wells.

Efforts have been made to lessen the loss of fluid from an aqueous cement slurry into adjacent porous media, particularly by admixing with the aqueous cement slurry a fluid-loss control agent. However, in most instances the use of a known additive for this purpose has been accompanied by one or more undesirable effects such as retardation or acceleration of the setting rate, incompatibility of the additive with other cement additives present, precipitation of the cement prior to set, and lessening of the ultimate physical properties of the set cement. In some instances, otherwise acceptable fluid-loss control additives for aqueous cement slurries have not provided an answer to the problem because of economic scarcity or cost of the additive.

A need therefore exists for an efficient and economical additive and method of use for inhibiting the loss of fluid from aqueous hydraulic cement slurries to porous media with which it comes into contact. The invention meets this need by providing an aqueous cement composition that remains pumpable until it has all been emplaced, sets at a substantially uniform rate to a substantially uniform solid, and has ultimate high strength values.

The invention encompasses a novel aqueous hydraulic cement slurry comprising an hydraulic cement, water, and an amino compound selected from the class consisting of polyalkylenimines, polyalkylenepolyamines, and mixtures thereof. The preferred polyalkylene-polyamines to employ are the polymeric condensates of a lower molecular weight polyalkylenepolyamine and a vicinal dihaloalkane. The polyalkylenimines are best illustrated by polymerized ethylenimine or propylenimine. Similarly, the polyalkylenepolyamines are best illustrated by polyethylene and polypropylene-polyamines. The proportion of water to cement falls within the range aforesaid. The amount of the amino compound to employ in the practice of the invention is between about 0.05 and about 8.0 parts, and more commonly between about 0.1 and 5.0 parts, by weight, per 100 parts of the dry cement present.

There is also preferably present a dispersant, e.g. an anionic surface active agent, in an amount of between about 0.1 and about 2.5 parts by weight per 100 parts of dry cement. A number of dispersants are acceptable for the practice of the invention but sulfonated naphthalene, of which a 95 percent active powder (available under the name Nopcosant), is preferred.

It is recommended that the average molecular weight of the amino compound required to be used in the practice of the invention be at least about 400. Larger average molecular weights are preferred, e.g. 10,000 to 1,000,000 or higher.

The amino compound employed in the practice of the invention may be prepared according to any one of a number of known procedures. Methods of preparing polyalkylenimines are described in the section entitled "Polymerization of Olefin Imines" by G. D. Jones, pages 521 to 534, in The Chemistry of Cationic Polymerization, edited by P. H. Plesch, published by MacMillan Co. (1963). Methods of preparing polyalkylene-polyamines aer described in U.S. Patents 2,595,935 and 2,694,633. Preferred procedures to employ to make either (1) the polyalkylenimines or (2) the preferred polyalkylenepolyamines consisting of the polymeric condensate of polyalkylenepolyamines and vicinal dihaloalkanes are described in application S.N. 208,117, filed July 6, 1962 by Garms et al.

The general method of preparing the polyalkylenimines therein described comprises: (1) mixing together an alkylenimine, a vicinal dihaloalkane as a catalyst or initiator, an alkali metal salt and a solvent and (2) heating the continuously stirred mixture to accelerate polymerization of the alkylenimine monomer, and subjecting the reaction mixture to a shearing force during the polymerization reaction period. The alkylenimines most commonly polymerized are ethylenimine and propylenimine.

The general method of preparing the higher molecular weight polyalkylenepolyamines is to react one or more polyalkylenepolyamines with a vicinal dihaloalkane as described in said application which comprises (1) mixing together a solution of a polyalkylenepolyamine a vicinal dihaloalkane, and an alkali metal salt, (2) heating the mixture while it is continuously stirred and (3) subjecting the reaction mixture to a shearing force as in the preparation of the polyalkylenimines, during the reaction period.

In the above general methods, the solvent employed is water, a water-soluble alcohol or a mixture thereof. The vicinal dihaloalkane contains from 2 to about 6 carbon atoms and the halogen substituents are bromine, chlorine or a combination thereof. In the preparation of polyalkylenimines the dihaloalkane is employed as an initiator in an amount equal to from about 1.0 to 4.5 weight percent of the alkylenimine. In the preparation of polymeric condensates the dihaloalkane is employed as a reactant in an amount equal to about 15 to 25 weight percent of the polyalkylenepolyamine starting material. The alkali metal salt is selected from the sodium, potassium, and lithium salts of carboxylic acids having from 1 to 6 carbon atoms (e.g. formic, acetic, propionic, butyric, oxalic and citric acids) and of mineral acids (e.g. hydochloric, hydrobromic, sulfuric, phosphoric and nitric acids). The salt is employed in an amount such that the reaction solvent contains from about 1 to 20 weight percent of the salt wtih a concentration of from about 5 to 10 weight percent preferred.

The temperature utilized may extend over a range from about 20° to about 140° C. with a range of 70° to about 90° C. preferred. While the pressure may range from atmospheric up to 75 pounds per in.$^2$ and even higher, the reaction is preferably run at autogenous pressures.

The shearing action may be provided by any of a variety of procedures. One convenient method is to cycle the reaction mixture from a bottom outlet in the reaction vessel through an externally located shearing apparatus, such as a gear pump, back into the top of the reaction vessel. The apparatus employed to accomplish shearing may be any type which produces sufficient shear stress on the reaction mixture to reduce the size of the larger polymer molecules being formed. Examples of types of shearing devices suitable are centrifugal pumps, eccentric gear pumps, cam type pumps, piston pumps in sequence with a homogenizing valve, and the like. Periodic viscosity checks are taken on 1 percent aqueous solutions of the polymer at 100° F. as measured on an Ostwald viscometer. When the viscosity of such solution is between about 2 and 3 centistokes, the reaction is deemed complete and is discontinued. The shearing action is generally carried out by continual cycling of the reaction mixture until sampling of the contents indicates substantial completion of the reaction as determined by viscosity measurements. However, intermittent cycling may be used.

The following procedure is suggested because it offers advantages of economy; polyethylenepolyamine remains as still bottoms in the preparation of ethylenediamine after ethylenediamine has been distilled over. The still bottoms are reacted with ethylene dichloride in water as generally described hereinabove, whereby the molecular weight is increased. The reaction is permitted to continue until the desired molecular weight is attained, as related to the viscosity (as above stated) of between about 2 and 3 centistokes, as measured in a 1 percent by weight aqueous solution of the polyamine at 100° F. The final product comprises about a 30 percent to 45 percent by weight polyethylenepolyamine, some NaCl and HCl, and balance water. The final product without further treatment may be admixed with the water to be used to prepare an aqueous cement slurry or with the slurry already made.

The method of the invention is illustrated by the examples set out hereinafter.

SERIES ONE

In all the examples, the ratio of cement to water employed in the slurry was 15 pounds of cement and enough water to make a gallon of slurry at room temperature. This is substantially 46 parts of water per 100 parts by weight of dry cement. Each of the examples of this series contained 1 percent Nopcosant dispersant. The fluid loss additive employed in accordance with the invention was the polyethylenimine composition prepared by reacting ethylenimine with ethylene dichloride as described above. It consisted of about 33 percent polyethylenimine, 2–5 percent HCl, and balance water. A 1 percent by weight aqueous solution of the polymer had a viscosity of about 2.4 centistokes at 100° F. The polymer had an average molecular weight of between about 300,000 and 400,000. The amounts thereof employed are shown in the tables set forth hereinafter.

This series was run to show that the presence of the amino compound in the cement slurry according to the invention does not impair the compressive strength of the slurry when set to a solid.

The cement slurries of the examples were prepared by admixing the Nopcosant, dry cement, water and the amino compound (in the amount shown in Table I). Comparative tests ($A_1$, $B_1$ and C) were run to show the compressive strength values obtained in the absence of the amino compound. The compressive strength values were obtained in accordance with the standard compressive strength tests set forth in API RP 10B, 13th edition (1964), section 7. The results of the tests are shown in Table I.

TABLE I

| Test identification: | Types of Portland Cement Used | Additive | Time of Test in Hr. | Temp., ° F. | Strength in p.s.i. |
|---|---|---|---|---|---|
| A | API Class A | None | 24 | 80 | 2,000 |
| 1 | do | 1.5% PEI [1] | 24 | 80 | 1,454 |
| B | do | None | 34 | 120 | 3,000 |
| 2 | do | 1.5% PEI | 24 | 120 | 3,793 |
| C | do | None | 24 | 140 | 5,000 |
| 3 | do | 1.5% PEI | 24 | 140 | 4,392 |

[1] PEI is polyethylenimine.

Reference to the table shows that when the cement has been allowed to set for 24 hours at any temperature from 80° F. to 140° F., the compressive strength tests of the set cement according to the invention are highly satisfacfactory and accordingly, that it is suitable for any common use to which an hydraulic cement may be put.

SERIES TWO

Portions of the cement slurries prepared in Series One, including both those for comparative purposes and those which are illustrative of the practice of the invention were tested for their fluid loss control properties. Tests A, 4, 5, 7 and 8 were run according to API RP 10B Section 5 employing the Baroid low-temperature low-pressure cell. Test 6 was run by first subjecting the aqueous slurry to the treatment required by Schedule 6 of Section 10 in API RP 10B in an atmospheric consistometer and thereafter employing the Baroid high-temperature high-pressure cell of Section 5. Test 9 was run by first subjecting the aqueous slurry to the treatment required by Schedule 8 of Section 10 of API RP 10B and thereafter obtaining the fluid loss employing the Baroid high-temperature high-pressure cell of Section 5. All tests employed a 325 mesh screen.

SERIES THREE

To show the thickening effect only on an aqueous cement slurry by the presence of the amino compound in accordance with the invention, tests were run employing the standard test for thickening time in accordance with either Schedule 6 or Schedule 8 of Section 10 of API RP 10B as set out in the table employing the pressure-temperature thickening-time tester. The cement slurries tested comprised 46 parts of water per 100 parts of Class A cement or 40 parts of water per 100 parts of Class E cement. 1 percent of Nopcosant by weight of the dry cement was also present as in the previous examples. The results are shown in Table III.

TABLE III

| Test identification: | Slurry First Treated According to API Schedule | Type Portland Cement Used | Additive | Thickening Time According to Section 9 |
|---|---|---|---|---|
| 10 | 6 | Class A | 1.5% PEI [1] | 1 hr. 53 min. |
| E  | 6 | do      | 0            | 1 hour. |
| 11 | 8 | Class E | 1.5% PEI    | 6 hrs. 32 min. |
| F  | 8 | do      | 0            | 15 minutes. |

[1] PEI is polyethylenimines.

Reference to the table shows that the thickening time was somewhat increased for both Class A and Class E aqueous cement slurry by the presence of the amino compound but that the increased length of time was not sufficiently greater to interfere with its normal use. In the case of the Class E cement, tested under the conditions of Schedule 8, some reduction in thickening time from that obtained using 1.5 percent of the amino compound may be desired. Interpolation of the results indicates that between about 0.25 percent and 1.0 percent polyethylen-

TABLE II

| Test identification: | Type of Portland Cement Used | Additive | Temp., °F. | Pressure in p.s.i. | Ml. in 30 minutes |
|---|---|---|---|---|---|
| D | API Class A | None | [2] 80 | 100 | ([5]) |
| 4 | do | 1.5% PEI [1] | [2] 80 | 100 | 5 |
| 5 | do | 1.0% PEI | [2] 80 | 100 | 25 |
| 6 | do | 1.5% PEI | [3] 144 | 1,000 | 21 |
| 7 | do | 1.5% PEI, 2.0% CaCl₂ | [2] 80 | 100 | 5 |
| 8 | do | 1.5% PEI, 37% NaCl | [2] 80 | 100 | 9 |
| 9 | do | 1.5% PEI | [4] 205 | 1,000 | 34 |

[1] PEI is polyethylenimine.
[2] Measured on Baroid low-pressure low-temperature cell using 325 mesh screen.
[3] Measured, after API Schedule 6 of Section 10, on Baroid High-pressure High-Temperature Cell using 325 mesh screen.
[4] Measured, after API Schedule 8 of Section 10, on Bariod High-Pressure High Temperature-Cell using 325 mesh screen.
[5] 100 ml. in 20 sec.

Reference to comparative Run A of the table shows that the loss of fluid to the formation in the absence of the amino compound, required to be present in accordance with the invention, was 100 milliliters in 20 seconds. This rate of loss, of course, is prohibitive for the use of the cement slurry for a number of purposes. Reference to the examples of the table shows that 1 percent of the polyethylenimine gives acceptable improved results but that 1.5 percent thereof gives more satisfactory results. Greater amounts than 1.5 percent may be employed but the use of such additional amounts do not produce sufficiently improved results to make such increased amounts advisable. The table also shows that higher temperatures such as 144° F. and 205° F. and at advanced pressures of as high as 1000 p.s.i. still result in satisfactory fluid loss inhibition when the amino compound is present in accordance with the practice of the invention.

imine gives a thickening time for a Class E cement slurry of between about 1 hour and 4 hours which would be desirable and would also provide against loss of fluid from the slurry.

The following examples illustrate the use of polyethylenepolyamine in the practice of the invention.

SERIES FOUR

Nopcosant (to aid dispersion) and polyglycol (to lessen any tendency to foam) were admixed with water. In tests numbered 13, CaCl₂ was also added as an accelerator to set. In test numbered 15 a synthetic NaCl brine was employed instead of water. Sufficient Class A cement was admixed with the aqueous solution thus prepared in each test to provide the standard test proportion of 46 parts of water, by weight per 100 parts of dry cement. The fluid loss properties were then ascertained according to Ssection 5 of API RP 10B. The parts by weight of additives per 100 parts of dry cement and the test results are shown in Table IV.

TABLE IV.—POLYALKYLENEPOLYAMINE AS FLUID-LOSS CONTROL ADDITIVE FOR AQUEOUS CEMENT SLURRY

| Test No. | Poly-ethylene-poly-amine | Nopcosant | Poly-glycol[1] | CaCl$_2$ | NaCl | Milliliters in 30 min. at 80° F. |
|---|---|---|---|---|---|---|
| 12 | 1.0 | 1.0 | 0.15 | 0 | 0 | 25 |
| 13 | 1.5 | 1.0 | 0.15 | 0 | 0 | 5 |
| 14 | 1.5 | 1.0 | 0.15 | 2 | 0 | 5 |
| 15 | 1.5 | 1.0 | 0.15 | 0 | 37 | 9 |

[1] Polyethylene glycol of an average molecular weight of about 4,000.

Series Five and Six which follow were conducted by first subjecting the aqueous slurries to the increasing temperatures and pressures of either Schedule 6 or Schedule 8 of Section 10 of API RP 10B (as hereinafter stated). A polyalkylenepolyamine was the fluid-loss control agent employed in the aqueous cement slurry.

SERIES FIVE

An aqueous cement slurry was prepared by admixing, by weight, 1.5 parts of the polyethylenepolyamine employed in Series Four; 0.1 part of Nopcosant (as a dispersant); and 0.10 part of the polyglycol employed in Series Four (as an antifoaming agent) and thereafter admixing 46 parts of the solution so prepared with 100 parts of Class A cement. The slurry so prepared was subjected to the increasing temperature and pressures of Schedule 6 of Section 10 of API RP 10B to the maximum pressure of 7480 p.s.i. and maximum temperature of 144° F. employing the atmospheric pressure consistometer as described on pages 13 and 14 of API RP 10B. While at 144° F. the so treated slurry was transferred to the high pressure filter press required in Section 5 of API RP 10B and the filter loss ascertained. The filter loss at 1000 p.s.i. was 21 milliliters in 30 minutes.

Two portions of the slurry were allowed to set at 80° F. for 24 hours and the compressive strength determined according to Section 7 of API RP 10B. The results of the two tests were 530 p.s.i. and 540 p.s.i.

SERIES SIX

This series of tests was carried out similarly to Series Five except: 0.25 part by weight of the polyglycol (average molecular weight of about 4000) was employed (instead of 0.10 part); Class E cement was employed (instead of Class A); and Schedule 8 of Section 10 of API RP 10B was followed (instead of Schedule 6). The fluid loss according to Section 5 employing the high pressure filter press was obtained and found to be 40 milliliters in 30 minutes at 1000 p.s.i. and 200° F.

When it is realized that an aqueous hydraulic cement slurry without fluid-loss additive gives a fluid loss of several hundred milliliters, by the standard API tests employed above, in less than one minute, reference to the examples shows that either the polyalkylenimine or polyalkylenepolyamine is an effective fluid loss control agent when admixed with an aqueous hydraulic cement slurry.

To cement off intruding brine or water entering a wellbore penetrating the earth or to secure a casing therein or to carry out a grouting operation, an aqueous slurry consisting essentially of an hydraulic cement, an amino compound, and preferably sulfonated naphthalene as a surfactant in the proportion employed in the examples, is prepared and forced into contact with the earth, as by pumping down the wellbore or moving the slurry along a conveyor to the location where it is desired that the cement be deposited and allowed to set. The practice of the invention lessens the loss of liquid from the slurry during set and accordingly decreases damage to the surrounding earthen formation, decreases loss of cement, and provides better control over placement, setting time and compressive strength.

Having described our invention what we claim and desire to protect by Letters Patent is:

1. An aqueous hydraulic cement composition, settable to a hard monolithic solid, consisting essentially of an hydraulic cement selected from the class consisting of Portland, aluminous, and Pozzolan cements and mixtures thereof, and water in an amount of between 35 and 55 parts of water per 100 parts dry weight of the cement and containing in admixture therewith an anionic surface active agent in an amount of between about 0.1 and 2.5 parts per 100 parts dry weight of cement, and between about 0.05 and about 8.0 parts, per 100 parts of dry cement, of an amino compound selected from the class consisting of polyalkylenimines, polyalkylenepolyamines, and mixtures thereof, having an average molecular weight of at least about 10,000.

2. The aqueous hydraulic cement slurry of claim 1 wherein the amino compound employed consists essentially of polyethylenimine.

3. The aqueous hydraulic cement slurry of claim 1 wherein the amino compound employed consists essentially of polyethylenepolyamine.

4. The aqueous hydraulic cement slurry of claim 1 wherein the amino compound employed consists essentially of a mixture of both polyethylenimine and polyethylenepolyamine.

5. The composition of claim 1 wherein the proportion of water to cement is between 40 and 50 parts of water per 100 parts of dry weight of cement and the amount of said amino compound present is between 0.1 and 5.0 parts per 100 parts of dry cement.

6. The aqueous hydraulic cement composition of claim 1 wherein said anionic surface active agent is sulfonated naphthalene.

7. In the method of cementing, employing an aqueous slurry of a hydraulic cement selected from the class consisting of Portland, aluminous, and Pozzolan cements and mixtures thereof wherein the slurry is brought into contact with a porous medium during the setting period, the improvement which comprises admixing with said aqueous hydraulic cement slurry an effective amount of an anionic surfactant and an amino compound to lessen loss of fluid to the formation, selected from the class consisting of polyalkylenimines and polyalkylenepolyamines having an average molecular weight of at least about 10,000 and locating the aqueous cement slurry so made in contact with said porous medium.

8. The method according to claim 7 wherein the aqueous hydraulic cement composition brought into contact with the porous medium is that consisting of 100 parts of hydraulic cement, between 35 and 55 parts of water, and between 0.05 and 8.0 parts of an amino compound selected from the class consisting of polyethylenimine, polyethylenepolyamine and mixtures thereof.

9. The method according to claim 7 wherein the amino compound employed is the condensation product of a lower molecular weight polyalkylenepolyamine and a vicinal dihaloalkane and has a molecular weight of at least about 10,000.

10. The method according to claim 7 wherein said amino compound consists essentially of polyethylenimine.

11. The method according to claim 7 wherein said amino compound consists essentially of polyethylenepolyamine.

12. The method according to claim 7 wherein said amino compound is a mixture of polyethylenimine and polyethylenepolyamine.

13. The method according to claim 7 wherein said surface active agent is sulfonated naphthalene in an amount of between about 0.1 and 2.5 parts by weight per 100 parts by weight of hydraulic cement present.

References Cited

UNITED STATES PATENTS

| | | | |
|---|---|---|---|
| 2,745,815 | 5/1956 | Mussell | 260—37 |
| 3,053,674 | 9/1962 | Liberthson et al. | 106—90 |
| 3,287,145 | 11/1966 | Fischer | 106—90 |
| 2,993,016 | 7/1961 | Sucetti | 260—29.2 |
| 3,042,612 | 7/1962 | Roebuck et al. | |
| 3,042,641 | 7/1962 | West et al. | 260—29.2 |
| 3,140,269 | 7/1964 | Wahl et al. | |
| 3,240,736 | 3/1966 | Belkwith | 260—29.2 |
| 3,271,307 | 9/1966 | Dickson et al. | |

MURRAY TILLMAN, Primary Examiner

J. C. BLEUTGE, Assistant Examiner

U.S. Cl. X.R.

106—90, 104, 117, 119, 293, 295; 252—8, 55; 260—37